(12) United States Patent
Chien et al.

(10) Patent No.: US 11,695,596 B2
(45) Date of Patent: Jul. 4, 2023

(54) MULTI-LEVEL SIGNAL TRANSMITTER AND METHOD THEREOF

(71) Applicant: Realtek Semiconductor Corp., Hsinchu (TW)

(72) Inventors: Ting-Hsu Chien, San Jose, CA (US); Chia-Liang (Leon) Lin, Fremont, CA (US)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 194 days.

(21) Appl. No.: 17/233,597

(22) Filed: Apr. 19, 2021

(65) Prior Publication Data

US 2022/0337458 A1 Oct. 20, 2022

(51) Int. Cl.
*H04L 25/03* (2006.01)
*H04L 25/02* (2006.01)
*H04L 25/49* (2006.01)

(52) U.S. Cl.
CPC ...... *H04L 25/03114* (2013.01); *H04L 25/028* (2013.01); *H04L 25/0272* (2013.01); *H04L 25/4925* (2013.01); *H04L 2025/03363* (2013.01)

(58) Field of Classification Search
CPC ....... H04L 2025/03363; H04L 25/0272; H04L 25/028; H04L 25/03114; H04L 25/4917; H04L 25/4925
See application file for complete search history.

(56) References Cited

U.S. PATENT DOCUMENTS

| 9,525,402 | B1 | 12/2016 | Chien et al. |
| 2010/0315271 | A1 | 12/2010 | Chung |
| 2015/0036730 | A1 | 2/2015 | Kim et al. |
| 2016/0182080 | A1 | 6/2016 | Vasani et al. |
| 2019/0020415 | A1 | 1/2019 | Agazzi et al. |

FOREIGN PATENT DOCUMENTS

CN 101924556 A 12/2010

*Primary Examiner* — Nader Bolourchi
(74) *Attorney, Agent, or Firm* — McClure, Qualey & Rodack, LLP

(57) ABSTRACT

A multi-level signal transmitter includes an encoder figured to receive an input data and output a plurality of logical signal sets, each of said plurality of logical signal sets comprising a plurality of logical signals; and a plurality of tree-structured drivers configured to receive said plurality of logical signal sets, respectively, and jointly establish an output voltage at an output node, wherein each of said tree-structure drivers comprises a plurality of inverters configured to receive said plurality of logical signals of its respective logical signal set and jointly establish a joint voltage at a bifurcation node via coupling to the bifurcation node through a plurality of first-level weighting resistors, and a second-level weighting resistor configured to couple the bifurcation node to the output node.

14 Claims, 4 Drawing Sheets

MULTI-LEVEL SIGNAL TRANSMITTER AND METHOD THEREOF

BACKGROUND OF THE DISCLOSURE

Field of the Disclosure

The present disclosure generally relates to multi-level signal transmission, and more particularly relates to multi-level signal transmitter with improved accuracy.

Description of Related Art

As shown in FIG. 1, a conventional multi-level signal transmitter 100 comprises an encoder 190 configured to receive an input data and output a plurality of logical signals $B_0$, $B_1$, $B_2$, $B_3$, and so on, in accordance with an encoding scheme; and a plurality of inverters INV0, INV1, INV2, INV3, and so on, configured to receive said plurality of logical signals $B_0$, $B_1$, $B_2$, $B_3$, and so on, respectively, and jointly determine an output voltage output $V_{130}$ at an output node 130 via a plurality of coupling resistors $R_{c0}$ $R_{c1}$, $R_{c2}$, $R_{c3}$, and so on, respectively. Besides, a load $R_{load}$ shunts the output node 130 to ground to provide a termination. A level of the output voltage $V_{130}$ is jointly determined by logical inversions of $B_0$, $B_1$, $B_2$, $B_3$, and so on, in a weighted sum manner. In an embodiment, inverters INV0, INV1, INV2, INV3, and so on are configured to have a low output impedance that is substantially smaller than resistances of coupling resistors $R_{c0}$, $R_{c1}$, $R_{c2}$, $R_{c3}$, and so on, respectively; in this case, weights of logical inversions of $B_0$, $B_1$, $B_2$, $B_3$, and so on, are approximately inversely proportional to $R_{c0}$ $R_{c1}$, $R_{c2}$, $R_{c3}$, and so on, respectively. Mathematically, the output voltage $V_{130}$ can be written as $$V_{130} \cong V_{DD} R_{tot} \cdot \left( \frac{1-B_0}{R_{c0}} + \frac{1-B_1}{R_{c1}} + \frac{1-B_2}{R_{c2}} + \frac{1-B_3}{R_{c3}} + \ldots \right) \quad (1)$$

where $$R_{tot} = \frac{1}{\frac{1}{R_{load}} + \frac{1}{R_{c0}} + \frac{1}{R_{c1}} + \frac{1}{R_{c2}} + \frac{1}{R_{c3}} + \ldots} \quad (2)$$

Here, $V_{DD}$ denotes a power supply voltage for inverters INV0, INV1, INV2, INV3, and so on.

This way, $V_{130}$ is a multi-level voltage signal of a value that is a weighted sum of logical inversions of $B_0$, $B_1$, $B_2$, $B_3$, and so on, wherein a weight of each logical inversion is inversely proportional to a resistance of its respective coupling resistor. In a particular case of interest, an impedance matching is required, wherein an output impedance $Z_{tx}$ looking back from the output node 130, as shown in FIG. 1, is approximately equal to $R_{load}$; this can be fulfilled by choosing values of $R_{c0}$, $R_{c1}$, $R_{c2}$, $R_{c3}$, such that:

$$\frac{1}{R_{load}} \cong \frac{1}{R_{c0}} + \frac{1}{R_{c1}} + \frac{1}{R_{c2}} + \frac{1}{R_{c3}} + \ldots \quad (3)$$

In U.S. Pat. No. 9,525,402, Chien et al. disclosed a transmitter wherein: a binary encoding scheme is used; $R_{c0}$ is chosen to be twice of $R_{load}$, i.e. $R_{c0}=2R_{load}$; all but a last resistor of said plurality of resistors $R_{c0}$, $R_{c1}$, $R_{c2}$, $R_{c3}$, and so on, form a power-of-two weighted resistor array, i.e. $R_{c0}$, $R_{c1}$, $R_{c2}$, $R_{c3}$, and so on form a power-of-two sequence such that $R_{c1}=2R_{c0}$, $R_{c2}=2R_{c1}$, and so on; and a resistance of the last resistor of said plurality of resistors $R_{c0}$, $R_{c1}$, $R_{c2}$, $R_{c3}$, and so on, is chosen in accordance with equation (3). In addition, the binary encoding scheme disclosed therein also includes conditionally inverting and delaying each of said plurality of logical signals $B_0$, $B_1$, $B_2$, $B_3$, and so on, to fulfill a de-emphasis function. By way of example but not limitation: there are totally four inverters and four coupling resistors; $R_{load}$ is 50 Ohm; $R_{c0}$ is 100 Ohm; $R_{c1}$ is 200 Ohm; $R_{c2}$ is 400 Ohm; and $R_{c3}$ is 400 Ohm and is the last resistor. This way, equation (3) is met.

In a manufacturing process, however, it is not likely to have $R_{c0}$, $R_{c1}$, $R_{c2}$, and so on form a perfect power-of-two sequence due to a limited engineering tolerance. Therefore, logical inversions of $B_0$, $B_1$, $B_2$, $B_3$, and so on, might not be accurately weighted, and an accuracy of a level of the output voltage $V_{130}$ might be compromised. An inaccuracy of the level of the output voltage $V_{130}$ leads to a nonlinear error that is frequently characterized by DNL (differential nonlinearity) and INL (integral nonlinearity). Concepts of DNL and INL are well understood by those of ordinary skill in the art and thus not described in detail herein.

What is desired is a method of improving an accuracy of a multi-level signal transmitter.

SUMMARY OF THIS DISCLOSURE

In an embodiment, a multi-level signal transmitter comprises: an encoder figured to receive an input data and output a plurality of logical signal sets, each of said plurality of logical signal sets comprising a plurality of logical signals; and a plurality of tree-structured drivers configured to receive said plurality of logical signal sets, respectively, and jointly establish an output voltage at an output node, wherein each tree-structure driver of said plurality of tree-structure drivers comprises a plurality of inverters configured to receive said plurality of logical signals of its respective logical signal set and jointly establish a joint voltage at a bifurcation node via coupling to the bifurcation node through a plurality of first-level weighting resistors, and a second-level weighting resistor configured to couple the bifurcation node to the output node.

In an embodiment, a method of multi-level signal transmission comprises: receiving an input data; encoding the input data into a plurality of logical signal sets using an encoder, each of said plurality of logical signal sets comprising a plurality of logical signals; and using a plurality of tree-structured drivers to receive said plurality of logical signal sets, respectively, and jointly establish an output voltage at an output node, wherein each of said tree-structured drivers comprises a plurality of inverters configured to receive said plurality of logical signals of its respective logical signal set and jointly establish a joint voltage at a bifurcation node via coupling to the bifurcation node through a plurality of first-level weighting resistors, and a second-level weighting resistor configured to couple the bifurcation node to the output node.

DETAILED DESCRIPTION OF THIS DISCLOSURE

Figure 1:
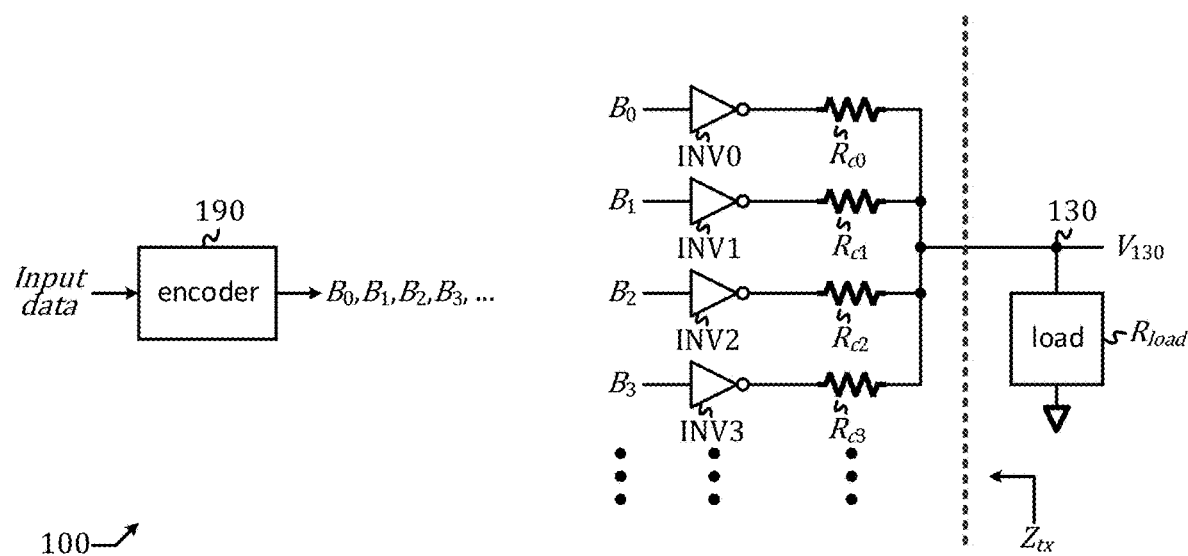
FIG. 1 shows a schematic diagram of a prior art multi-level signal transmitter.

The present disclosure is directed to multi-level signal transmitter. While the specification describes several example embodiments of the disclosure considered favorable modes of practicing the invention, it should be understood that the invention can be implemented in many ways and is not limited to the particular examples described below or to the particular manner in which any features of such examples are implemented. In other instances, well-known details are not shown or described to avoid obscuring aspects of the disclosure.

Persons of ordinary skill in the art understand terms and basic concepts related to microelectronics that are used in this disclosure, such as "circuit node," "ground," "inverter," "voltage," "load," "logical signal," "resistor," "resistance," and "impedance." Terms and basic concepts like these, when used in a context of microelectronics, are apparent to those of ordinary skill in the art and thus will not be explained in detail here.

Those of ordinary skills in the art can read schematics of a circuit comprising components such as inverters, resistors, and so on, and do not need a verbose description about how one component connects with another in the schematics. Those of ordinary skill in the art can recognize circuit symbols of inverter, resistor, and ground, and understand units such as Ohm and thus no explanations are needed of these.

This disclosure is presented in an engineering sense, instead of a rigorous mathematical sense. For instance, "A is equal to B" means "a difference between A and B is smaller than an engineering tolerance. "X is zero" means "an absolute value of X is smaller than an engineering tolerance." "A is substantially smaller than B" means a ratio between A and B is smaller than an engineering tolerance. In an embodiment, "A" is said to be substantially smaller than "B" when a ratio between "A" and "B" is less than 1/10.

In this disclosure, a "circuit node" is frequently simply stated as a "node" for short, when what it means is clear from a context.

A signal is a voltage of a variable level that carries a certain information and can vary with time. A level of the signal at a moment represents a state of the signal at that moment.

A logical signal is a voltage signal of two states: a low state and a high state. The low state is also known as a "0" state, while the high stage is also known as a "1" state. Regarding a logical signal Q, "Q is high" or "Q is low" means that "Q is in the high state" or "Q is in the low state." Likewise, "Q is 1" or "Q is 0" means that "Q is in the 1 state" or "Q is in the 0 state."

A first logical signal is said to be a logical inversion of a second logical signal if the first logical signal and the second logical signal always have opposite states. That is, when the first logical signal is 1, the second logical signal will be 0; when the first logical signal is 0, the second logical signal will be 1.

A logical inversion of a logical signal Q can be mathematically expressed as "1−Q," since when Q is 1, the logical inversion is 0, and when Q is 0, the logical inversion is 1.

Throughout this disclosure, a ground node is a node of substantially zero voltage (0 V). A power supply node is a node of a substantially fixed voltage and is denoted by "$V_{DD}$," which is a convention widely used in the literature. In this disclosure, depending on a context that is apparent to those of ordinary skill in the art, sometimes "$V_{DD}$" refers to the voltage level at the power supply node "$V_{DD}$." For instance, it is apparent that "$V_{DD}$ is 0.9V" means that the voltage level at the power supply node $V_{DD}$ is 0.9V.

Throughout this disclosure, a label of a resistor may also be used to refer to a resistance of the resistor, depending on a context. For instance, "$R_0$" is a label of a resistor, but it is clear from the context that in the mathematical expression "$1/R_0$," the "$R_0$" term refers to a resistance of the resistor "$R_0$."

Figure 2:
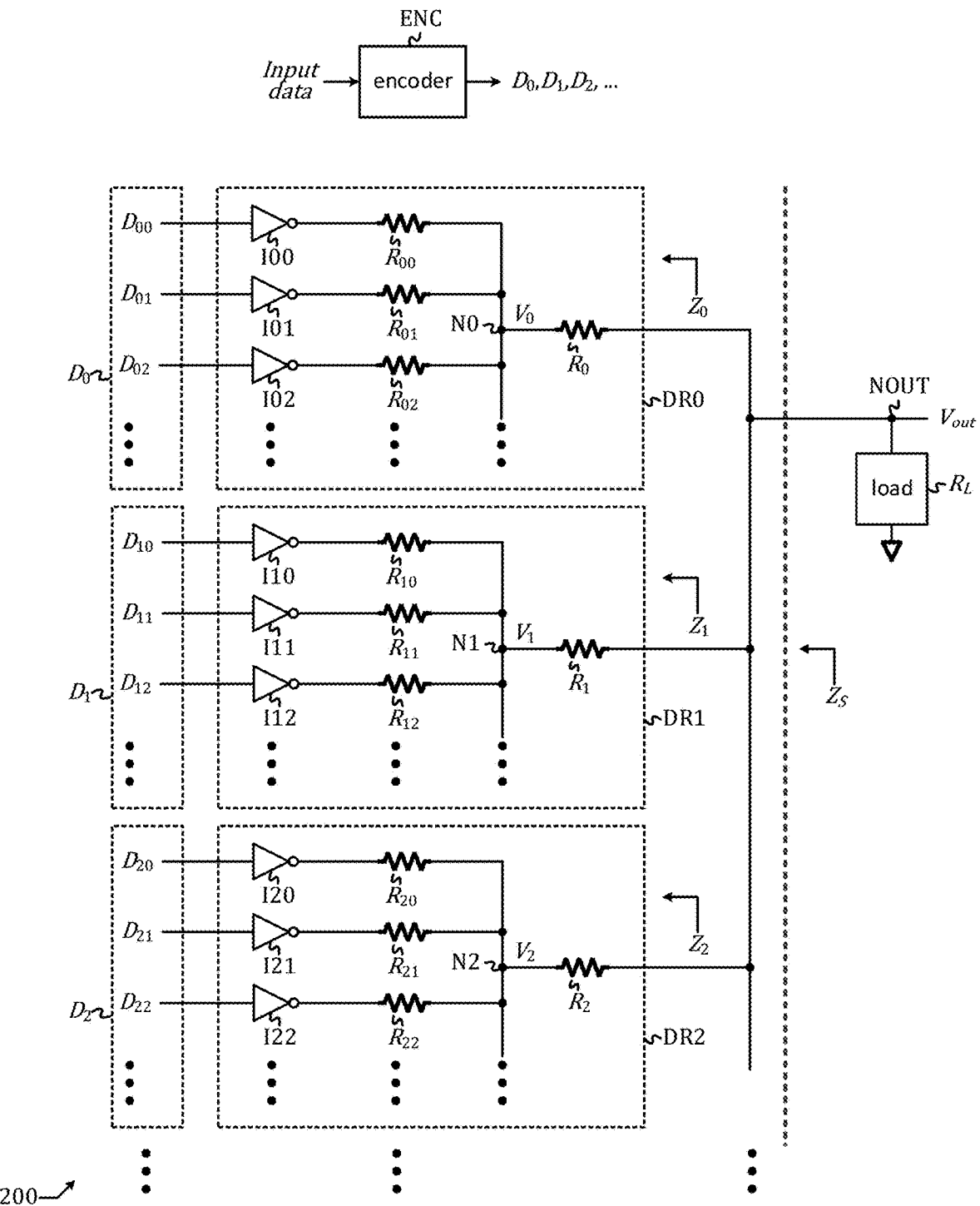
FIG. 2 shows a schematic diagram of a multi-level signal transmitter in accordance with an embodiment of the present disclosure.

A schematic diagram of a multi-level signal transmitter 200 in accordance with an embodiment of the present disclosure is shown in FIG. 2. Multi-level signal transmitter 200 comprises: an encoder ENC configured to receive an input data and output a plurality of logical signal sets $D_0$, $D_1$, $D_2$, and so on; and a plurality of tree-structured drivers DR0, DR1, DR2, and so on, configured to receive said plurality of logical signal sets $D_0$, $D_1$, $D_2$, and so on, respectively, and jointly establish an output voltage $V_{out}$ at an output node NOUT. The output node NOUT is terminated with a load $R_L$ that shunts the output node NOUT to ground. Each of said plurality of logical signal sets $D_0$, $D_1$, $D_2$, and so on, comprises a plurality of logical signals. To be specific, $D_0$ ($D_1$, $D_2$, . . . ) comprises logical signals $D_{00}$ ($D_{10}$, $D_{20}$, . . . ), $D_{01}$ ($D_{11}$, $D_{21}$, . . . ), $D_{02}$ ($D_{12}$, $D_{22}$, . . . ), and so on. Each tree-structured driver comprises: a plurality of inverters configured to receive the logical signals of a respective logical signal set and establish a joint voltage at a bifurcation node via coupling to the bifurcation node through a plurality of branch resistors, respectively; and a trunk resistor configured to couple the bifurcation node to the output node NOUT. To be more specific, tree-structured driver DR0 (DR1, DR2) comprises inverters I00 (I10, I20), I01 (I11, I21), I02 (I12, I22), and so on configured to receive logical signals $D_{00}$ ($D_{10}$, $D_{20}$), $D_{01}$ ($D_{11}$, $D_{21}$), $D_{02}$ ($D_{12}$, $D_{22}$), and so on, respectively, and establish a joint voltage $V_0$ ($V_1$, $V_2$) at a bifurcation node N0 (N1, N2) via coupling to the bifurcation node N0 (N1, N2) through branch resistors $R_{00}$ ($R_{10}$, $R_{20}$), $R_{01}$ ($R_{11}$, $R_{21}$), $R_{02}$ ($R_{12}$, $R_{22}$), and so on, respectively, and a trunk resistor $R_0$ ($R_1$, $R_2$) configured to couple the bifurcation node N0 (N1, N2) to the output node NOUT. Tree-structured driver DR0 (DR1, DR2) is said to have a tree structure, because when looking back from the output node NOUT it comprises the trunk resistor $R_0$ ($R_1$, $R_2$) that branches into a plurality of branch resistors $R_{00}$ ($R_{10}$, $R_{20}$), $R_{01}$ ($R_{11}$, $R_{21}$), $R_{02}$ ($R_{12}$, $R_{22}$), and so on at the bifurcation node N0 (N1, N2). Here, the terms "trunk" and "branch" pertain to description of topology, wherein a "trunk" branches into a plurality of "branches" that resembles a tree.

In an embodiment, in tree-structured driver DR0, inverters I00, I01, I02, and so on, have output impedances that are substantially smaller than resistances of branch resistors $R_{00}$, $R_{01}$, $R_{02}$, and so on, respectively, and the same condition also applies to tree-structured drivers DR1, DR2, and so on. Consequently, an impedance $Z_0$ ($Z_1$, $Z_2$, . . . ) looking back into tree-structured driver DR0 (DR1, DR2, . . . ) from the output node NOUT can be written as:

$$Z_0 \cong R_0 + \frac{1}{\frac{1}{R_{00}} + \frac{1}{R_{01}} + \frac{1}{R_{02}} + \ldots} \quad (4)$$

$$Z_1 \cong R_1 + \cfrac{1}{\cfrac{1}{R_{10}} + \cfrac{1}{R_{11}} + \cfrac{1}{R_{12}} + \ldots} \quad (5)$$

$$Z_2 \cong R_2 + \cfrac{1}{\cfrac{1}{R_{20}} + \cfrac{1}{R_{21}} + \cfrac{1}{R_{22}} + \ldots} \quad (6)$$

An output impedance $Z_s$ looking back into the multi-level signal transmitter 200 from the output node NOUT is:

$$Z_S = \cfrac{1}{\cfrac{1}{Z_0} + \cfrac{1}{Z_1} + \cfrac{1}{Z_2} + \ldots} \quad (7)$$

Combining equations (4), (5), (6), and (7) we obtain $$Z_S \cong \cfrac{1}{\cfrac{1}{R_0 + \cfrac{1}{\cfrac{1}{R_{00}} + \cfrac{1}{R_{01}} + \cfrac{1}{R_{02}} + \ldots}} + \cfrac{1}{R_1 + \cfrac{1}{\cfrac{1}{R_{10}} + \cfrac{1}{R_{11}} + \cfrac{1}{R_{12}} + \ldots}} + \cfrac{1}{R_2 + \cfrac{1}{\cfrac{1}{R_{20}} + \cfrac{1}{R_{21}} + \cfrac{1}{R_{22}} + \ldots}} + \ldots} \quad (8)$$

In an embodiment, all trunk resistors and branch resistors are chosen such that $Z_S$ is approximately equal to $R_L$, so that an impedance matching condition is met.

Tree-structure driver DR0 performs a weighted sum of logical inversions of $D_{00}$, $D_{01}$, $D_{02}$, and so on, wherein weights of logical inversions of $D_{00}$, $D_{01}$, $D_{02}$, and so on are inversely proportional to resistances of branch resistors $R_{00}$, $R_{01}$, $R_{02}$, and so on, respectively, and the weighted sum is represented by the joint voltage $V_0$. The same thing can be said about tree-structured drivers DR1 and DR2 and thus is not explicitly described herein. This is a first level weighted sum, and all the branch resistors are said to be first-level weighting resistors.

The joint voltages $V_0$, $V_1$, $V_2$, and so on are summed in a weighted manner via trunk resistors $R_0$, $R_1$, $R_2$, and so on, resulting in the output voltage $V_{out}$, wherein the weights of the joint voltages $V_0$, $V_1$, $V_2$, and so on are inversely proportional to the resistances of trunk resistors $R_0$, $R_1$, $R_2$, and so on, respectively. This is a second level weighted sum, and all the trunk resistors are said to be second-level weighting resistors.

All logical signals from all logical signal sets $D_0$, $D_1$, $D_2$, and so on are thus summed in a two-level weighted sum manner: in the first level the weights are determined by the branch resistors, and then in the second level the weighs are determined by the trunk resistors. This way, all logical signals in all logical signal sets contribute to the output voltage $V_{out}$, and each of them contributes with a weight that is determined in a two-level manner.

Mathematically, we have:

$$V_{out} = \frac{V_0 R_t}{R_0} + \frac{V_1 R_t}{R_1} + \frac{V_2 R_t}{R_2} + \ldots \quad (9)$$

where $$R_t = \cfrac{1}{\cfrac{1}{R_L} + \cfrac{1}{R_0} + \cfrac{1}{R_1} + \cfrac{1}{R_2} + \ldots} \quad (10)$$

This is an equation for the second-level weighted sum. Also, we have:

$$V_0 \cong V_{DD} R_{t0} \cdot \left( \frac{1-D_{00}}{R_{00}} + \frac{1-D_{01}}{R_{01}} + \frac{1-D_{02}}{R_{02}} + \ldots \right) \quad (11)$$

$$V_1 \cong V_{DD} R_{t1} \cdot \left( \frac{1-D_{10}}{R_{10}} + \frac{1-D_{11}}{R_{11}} + \frac{1-D_{12}}{R_{12}} + \ldots \right) \quad (12)$$

$$V_2 \cong V_{DD} R_{t2} \cdot \left( \frac{1-D_{20}}{R_{20}} + \frac{1-D_{21}}{R_{21}} + \frac{1-D_{22}}{R_{22}} + \ldots \right) \quad (13)$$

where $$R_{t0} = \cfrac{1}{\cfrac{1}{\cfrac{1}{\cfrac{1}{R_L} + \cfrac{1}{Z_S} - \cfrac{1}{Z_0}} + R_0} + \cfrac{1}{R_{00}} + \cfrac{1}{R_{01}} + \cfrac{1}{R_{02}} + \ldots} \quad (14)$$

$$R_{t1} = \cfrac{1}{\cfrac{1}{\cfrac{1}{\cfrac{1}{R_L} + \cfrac{1}{Z_S} - \cfrac{1}{Z_1}} + R_1} + \cfrac{1}{R_{10}} + \cfrac{1}{R_{11}} + \cfrac{1}{R_{12}} + \ldots} \quad (15)$$

$$R_{t2} = \cfrac{1}{\cfrac{1}{\cfrac{1}{\cfrac{1}{R_L} + \cfrac{1}{Z_S} - \cfrac{1}{Z_2}} + R_2} + \cfrac{1}{R_{20}} + \cfrac{1}{R_{21}} + \cfrac{1}{R_{22}} + \ldots} \quad (16)$$

Here, "$V_{DD}$" is a power supply voltage for all inverters in the multi-level signal transmitter 200.

An advantage of using a tree-structure driver is that an accuracy of a level of the output voltage $V_{out}$ is improved due to using the two-level weighted sum. Since the trunk resistor $R_0$ is common to all logical signals in the logical signal set $D_0$, there is no mismatch among all logical signals in the logical signal set $D_0$ in the second level weighted sum. The same thing can be said about logical signal sets $D_1$ and $D_2$. The inaccuracy is thus limited to mismatches among branch resistors $R_{00}$, $R_{01}$, $R_{02}$, and so on. The same thing can be said about logical signal sets $D_1$, $D_2$, and so on.

Another advantage is that a total sum of all resistance values from all resistors is reduced, compared to the case in the prior art that has no trunk resistor, thanks to re-using the trunk resistor that is common to all branches.

Figure 3:
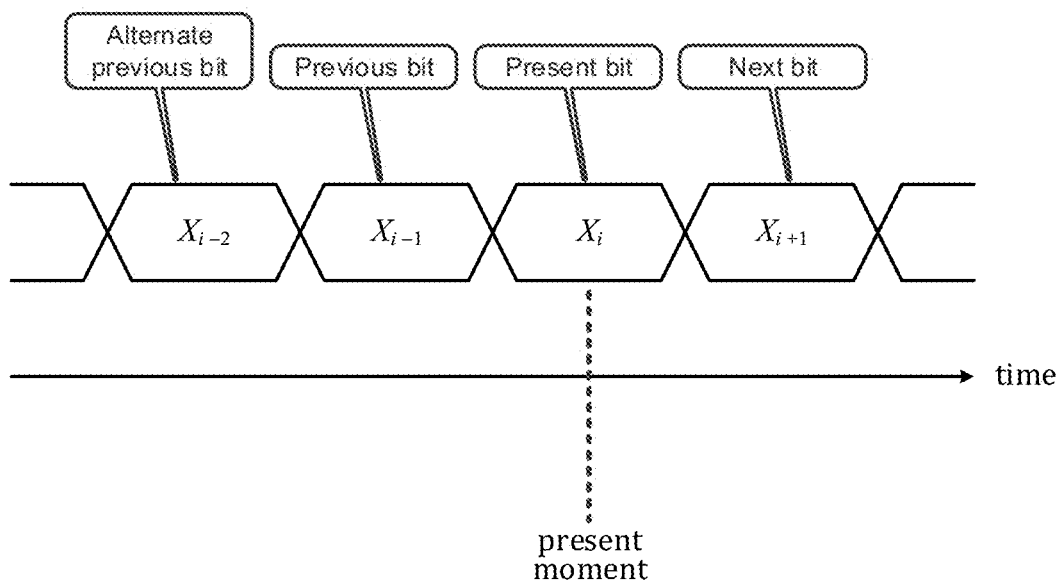
FIG. 3 shows a timing diagram of an input data to the multi-level signal transmitter of FIG. 2.

In an embodiment, the input data is a serial bit stream $X_0$, $X_1$, $X_2$, $X_3$, and so on that arrives sequentially, as illustrated by a timing diagram shown in FIG. 3. At a present moment, there is a present bit $X_i$ that has just arrived, wherein i is a time index corresponding to the present moment, a previous bit $X_{i-1}$ that precedes the present bit $X_i$, an alternate previous bit $X_{i-2}$ that precedes the previous bit $X_{i-1}$, and a next bit $X_{i+1}$ that succeeds the present bit $X_i$. In an embodiment, the serial bit stream $X_0$, $X_i$, $X_2$, $X_3$, and so on, is encoded by the encoder ENC into the logical signal sets $D_0$, $D_1$, $D_2$, and so on, to embody a FIR (finite impulse response) filter. In an embodiment, a 3-tap FIR filter is embodied, wherein the 3-tap FIR filter comprises a precursor tap, a main tap, and a post-cursor tap, and each logical signal in any one of logical signal sets $D_0$, $D_1$, $D_2$, and so on, can be independently set to one of $X_{i-1}$, $1-X_{i-1}$, $X_i$, $1-X_i$, $X_{i+1}$, and $1-X_{i+1}$, to embody a post-cursor tap, a negative post-cursor tap, a main tap, a negative main tap, a precursor tap, and a negative precursor tap, respectively. In many applications, the main tap is always positive, while the precursor tap and the post-cursor tap are always negative; in this case, each logical signal in any one of logical signal sets $D_0$, $D_1$, $D_2$, and so on, can be independently set to one of $1-X_{i-1}$, $X_i$, and $1-X_{i+1}$. Concepts of "FIR filter," "precursor tap," "main tap," and "post-cursor tap," are well understood by those of ordinary skill in the art and thus not explained in detail herein.

In another embodiment, a 4-tap FIR filter is embodied, wherein the 4-tap FIR filter comprises a precursor tap, a main tap, a first post-cursor tap, and a second post-cursor tap, and each logical signal in any one of logical signal sets $D_0$, $D_1$, $D_2$, and so on, can be independently set to one of $X_{i-2}$, $1-X_{i-2}$, $X_{i-1}$, $1-X_{i-1}$, $X_i$, $1-X_i$, $X_{i+1}$, and $1-X_{i+1}$, to embody a second post-cursor tap, a negative second post-cursor tap, a first post-cursor tap, a negative first post-cursor tap, a main tap, a negative main tap, a precursor tap, and a negative precursor tap, respectively.

By way of example but not limitation: $R_L$ is 50 Ohm; $V_{DD}$ is 0.9V; there are four tree-structured drivers DR0, DR1, DR2, and DR3 that comprise four chunk resistors $R_0$, $R_1$, $R_2$, and $R_3$, respectively; all the four chunk resistors are 100 Ohm; each of the four tree-structured drivers has four branch resistors and thus there are totally sixteen branch resistors $R_{00}$, $R_{01}$, $R_{02}$, $R_{03}$, $R_{10}$, $R_{11}$, $R_{12}$, $R_{13}$, $R_{20}$, $R_{21}$, $R_{22}$, $R_{23}$, $R_{30}$, $R_{31}$, $R_{32}$, and $R_{33}$, and all the sixteen branch resistors are 400 Ohm; DR0, DR1, DR2, and DR3 receive logical signal sets $D_0$, $D_1$, $D_2$, and $D_3$, respectively; $D_0$ comprises four logical signals $D_{00}$, $D_{01}$, $D_{02}$, and $D_{03}$; $D_1$ comprises four logical signals $D_{10}$, $D_{11}$, $D_{12}$, and $D_{13}$; $D_2$ comprises four logical signals $D_{20}$, $D_{21}$, $D_{22}$, and $D_{23}$; $D_3$ comprises four logical signals $D_{30}$, $D_{31}$, $D_{32}$, and $D_{33}$; there are totally sixteen logical signals and they are encoded from the serial bit stream $X_0$, $X_1$, $X_2$, $X_3$, . . . , in accordance with the following equations:

$$D_{00}=D_{10}=D_{20}=D_{30}=1-X_{i-1} \quad (17)$$

$$D_{01}=D_{11}=D_{21}=D_{31}=X_i \quad (18)$$

$$D_{02}=D_{12}=D_{22}=D_{32}=X_i \quad (19)$$

$$D_{03}=D_{13}=D_{23}=D_{33}=1-X_{i+1} \quad (20)$$

For i=1, 2, 3, 4, . . . , and so on. This embodies a 3-tap FIR comprising a precursor tap, a main tap, and a post-cursor tap that can be mathematically modeled by a z-transform transfer function:

$$H(z)=[-1/4 \cdot z+1/2-1/4 \cdot z^{-1}] \cdot z^{-1} \quad (21)$$

Inside the bracket on the right-hand side of equation (21): the first term "$-1/4 \cdot z$" is a negative precursor tap pertaining to the next bit $X_{i+1}$ and embodied by $D_{03}$, $D_{13}$, $D_{23}$, and $D_{33}$; the second term "1/2" is a main tap pertaining to the present bit $X_i$ and embodied by $D_{01}$, $D_{11}$, $D_{21}$, $D_{31}$, $D_{02}$, $D_{12}$, $D_{22}$, and $D_{32}$; and the third term "$-1/4 \cdot z^{-1}$" is a negative post-cursor tap pertaining to the previous bit $X_{i-1}$ and embodied by $D_{00}$, $D_{10}$, $D_{20}$, and $D_{30}$. Out of the totally sixteen logical signals, four of them are set to $1-X_{i-1}$, so the post-cursor tap coefficient is $-4/16$ (i.e. $-1/4$); eight of them are set to $X_i$, so the main tap coefficient is $8/16$ (i.e. $1/2$); and four of them are set to $1-X_{i+1}$, so the precursor tap coefficient is $-4/16$ (i.e. $-1/4$). A larger post-cursor tap is realized by assigning the previous bit $X_{i-1}$ (or its logical inversion $1-X_{i-1}$ if the post-cursor tap is negative) to more logical signals, while a larger precursor tap is realized by assigning the next bit $X_{i+1}$ (or its logical inversion $1-X_{i+1}$ if the precursor tap is negative) to more logical signals. Those skilled in the art can extend the same concept to embody FIR filter of four or more taps.

Inverters are well known in the prior art and thus not described in detail.

Figure 4:
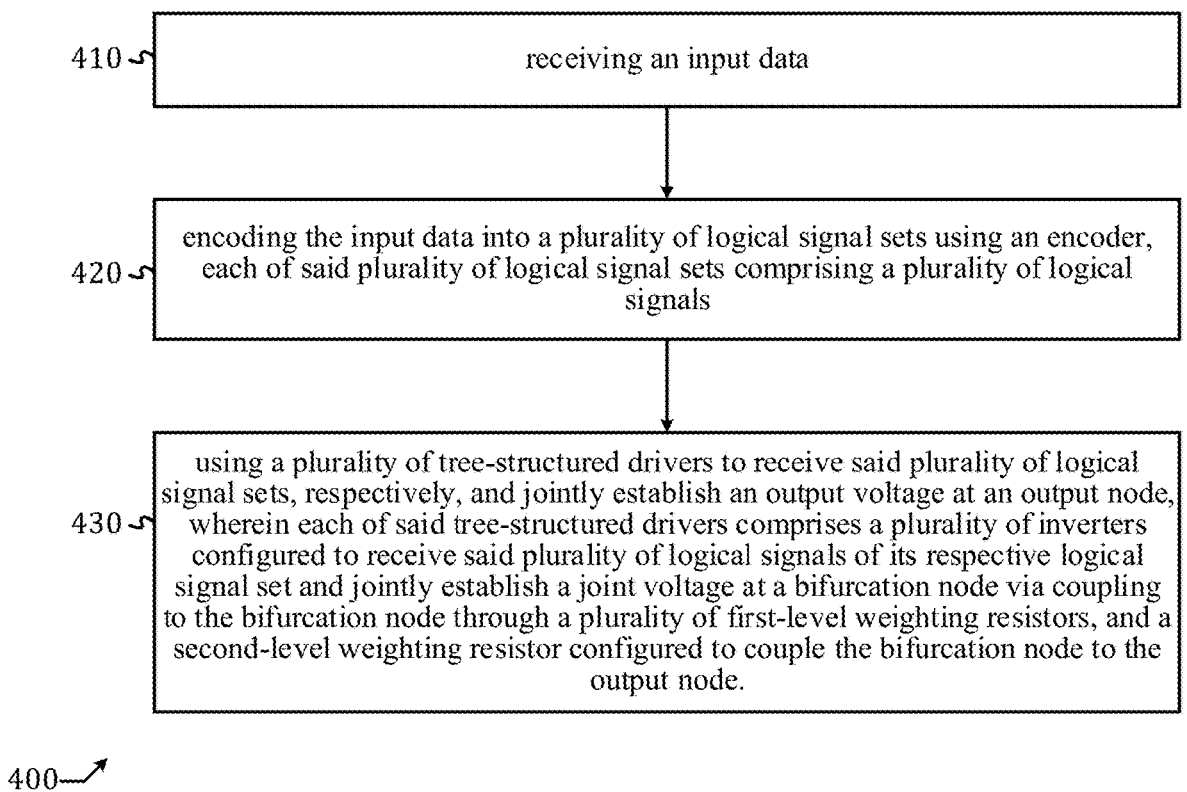
FIG. 4 shows a flow diagram of a method of multi-level signal transmission in accordance with an embodiment of the present disclosure.

As shown in a flow diagram 300 depicted in FIG. 4, a method of multi-level signal transmission in accordance with an embodiment of the present disclosure comprises: (step 410) receiving an input data; (step 420) encoding the input data into a plurality of logical signal sets using an encoder, each of said plurality of logical signal sets comprising a plurality of logical signals; and (step 430) using a plurality of tree-structured drivers to receive said plurality of logical signal sets, respectively, and jointly establish an output voltage at an output node, wherein each of said tree-structure drivers comprises a plurality of inverters configured to receive said plurality of logical signals of its respective logical signal set and jointly establish a joint voltage at a bifurcation node via coupling to the bifurcation node through a plurality of first-level weighting resistors, and a second-level weighting resistor configured to couple the bifurcation node to the output node.

Those skilled in the art will readily observe that numerous modifications and alterations of the device and method may be made while retaining the teachings of the disclosure. Accordingly, the above disclosure should not be construed as limited only by the metes and bounds of the appended claims.

What is claimed is:

1. A multi-level signal transmitter comprising:
   an encoder figured to receive an input data and output a plurality of logical signal sets, each of said plurality of logical signal sets comprising a plurality of logical signals; and
   a plurality of tree-structured drivers configured to receive said plurality of logical signal sets, respectively, and jointly establish an output voltage at an output node, wherein each of said tree-structure drivers comprises a plurality of inverters configured to receive said plurality of logical signals of its respective logical signal set and jointly establish a joint voltage at a bifurcation node via coupling to the bifurcation node through a plurality of first-level weighting resistors, and a second-level weighting resistor configured to couple the bifurcation node to the output node.

2. The multi-level signal transmitter of claim 1, wherein the input data is a serial bit stream comprising a plurality of bits that arrive sequentially, and at a present moment there is a present bit that has just arrived, a previous bit that precedes the present bit, an alternate previous bit that precedes the previous bit, and a next bit that succeeds the present bit.

3. The multi-level signal transmitter of claim 2, wherein the serial bit stream is encoded by the encoder to embody a FIR (finite impulse response) filter function.

4. The multi-level signal transmitter of claim 3, wherein the serial bit stream is encoded by the encoder to embody a 3-tap FIR filter function.

5. The multi-level signal transmitter of claim 4, wherein each of said plurality of logical signals of each of said plurality of logical signal sets is independently set to one of the following: the present bit, the previous bit, the next bit, a logical inversion of the present bit, a logical inversion of the previous bit, and a logical inversion of the next bit.

6. The multi-level signal transmitter of claim 3, wherein the serial bit stream is encoded by the encoder to embody a 4-tap FIR filter function.

7. The multi-level signal transmitter of claim 6, wherein each of said plurality of logical signals of each of said plurality of logical signal sets is independently set to one of the following: the present bit, the previous bit, the alternate previous bit, the next bit, a logical inversion of the present bit, a logical inversion of the previous bit, a logical inversion of the alternate previous bit, and a logical inversion of the next bit.

8. A method of multi-level signal transmission comprising:
receiving input data;
encoding the input data into a plurality of logical signal sets using an encoder, each of said plurality of logical signal sets comprising a plurality of logical signals; and
using a plurality of tree-structured drivers to receive said plurality of logical signal sets, respectively, and jointly establish an output voltage at an output node, wherein each of said tree-structured drivers comprises a plurality of inverters configured to receive said plurality of logical signals of its respective logical signal set and jointly establish a joint voltage at a bifurcation node via coupling to the bifurcation node through a plurality of first-level weighting resistors, and a second-level weighting resistor configured to couple the bifurcation node to the output node.

9. The method of multi-level transmission of claim 8, wherein the input data is a serial bit stream comprising a plurality of bits that arrive sequentially, and at a present moment there is a present bit that has just arrived, a previous bit that precedes the present bit, an alternate previous bit that precedes the previous bit, and a next bit that succeeds the present bit.

10. The method of multi-level transmission of claim 9, wherein the serial bit stream is encoded by the encoder to embody a FIR (finite impulse response) filter function.

11. The method of multi-level transmission of claim 10, wherein the serial bit stream is encoded by the encoder to embody a 3-tap FIR filter function.

12. The method of multi-level transmission of claim 11, wherein each of said plurality of logical signals of each of said plurality of logical signal sets is independently set to one of the following: the present bit, the previous bit, the next bit, a logical inversion of the present bit, a logical inversion of the previous bit, and a logical inversion of the next bit.

13. The method of multi-level transmission of claim 10, wherein the serial bit stream is encoded by the encoder to embody a 4-tap FIR filter function.

14. The method of multi-level transmission of claim 13, wherein each of said plurality of logical signals of each of said plurality of logical signal sets is independently set to one of the following: the present bit, the previous bit, the alternate previous bit, the next bit, a logical inversion of the present bit, a logical inversion of the previous bit, a logical inversion of the alternate previous bit, and a logical inversion of the next bit.

* * * * *